US007068675B1

(12) United States Patent
Shitaya

(10) Patent No.: US 7,068,675 B1
(45) Date of Patent: Jun. 27, 2006

(54) CONSTRUCTION MACHINE USING THE METHOD OF CONTROLLING COMMUNICATIONS AMONG ELECTRONIC DEVICES

(75) Inventor: Yoshiyuki Shitaya, Isehara (JP)

(73) Assignee: Komatsu, Ltd., Tokyo (JP)

( * ) Notice: Subject to any disclaimer, the term of this patent is extended or adjusted under 35 U.S.C. 154(b) by 0 days.

(21) Appl. No.: 09/544,202

(22) Filed: Apr. 7, 2000

(30) Foreign Application Priority Data

| Apr. 9, 1999 | (JP) | ................................. 11-102853 |
| Mar. 22, 2000 | (JP) | ............................. 2000-080688 |

(51) Int. Cl.
*H04L 12/40* (2006.01)

(52) U.S. Cl. ..................... 370/439; 370/466; 370/471; 701/33

(58) Field of Classification Search ............ 370/466–7, 370/282, 487, 470, 471, 472, 473, 437, 438, 370/489, 490; 701/33, 69; 710/119
See application file for complete search history.

(56) References Cited

U.S. PATENT DOCUMENTS

| 5,095,417 A | * | 3/1992 | Hagiwara et al. ............... 700/9 |
| 5,163,056 A | * | 11/1992 | Hagiwara et al. ........... 714/755 |
| 5,490,134 A | * | 2/1996 | Fernandes et al. ............. 370/79 |
| 5,555,171 A | * | 9/1996 | Sonehara et al. .............. 701/33 |
| 5,587,995 A | * | 12/1996 | Takebe et al. ............... 370/248 |
| 5,588,123 A | * | 12/1996 | Loibl .......................... 385/287 |
| 5,646,941 A | * | 7/1997 | Nishimura et al. .......... 370/389 |
| 6,167,061 A | * | 12/2000 | Nakatsugawa ............... 370/480 |
| 6,198,751 B1 | * | 3/2001 | Dorsey et al. ............... 370/466 |
| 6,377,995 B1 | * | 4/2002 | Agraharam et al. ......... 709/231 |

FOREIGN PATENT DOCUMENTS

JP      9-51322     2/1997

\* cited by examiner

Primary Examiner—Chau Nguyen
Assistant Examiner—Ian N. Moore
(74) Attorney, Agent, or Firm—Posz Law Group, PLC; R. Eugene Varndell, Jr.

(57) ABSTRACT

A plurality of electronic control devices for carrying out communications by using at least one of a plurality of different types of communication protocols are connected by a multiplex transmission serial communication line which supports communications by a plurality of different frame formats, and one of frame formats is allocated to one type of the communication protocols.

3 Claims, 7 Drawing Sheets

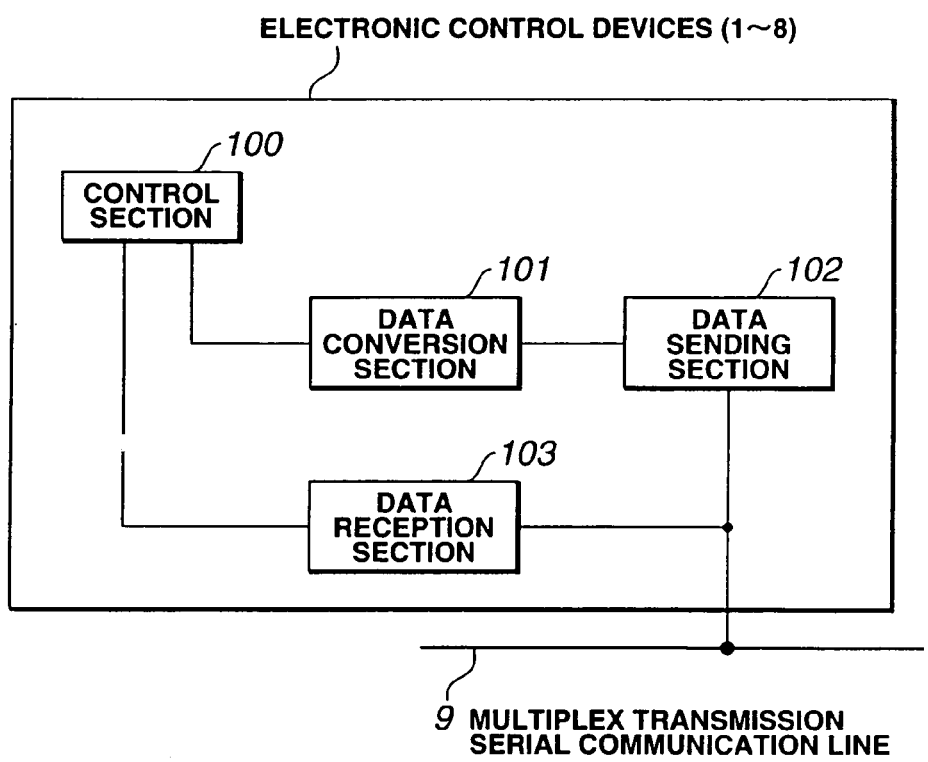

FIG.6(a) < FORMAT STD >
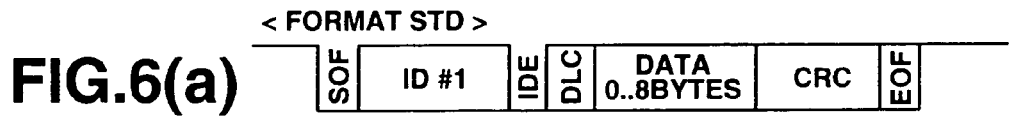
FIG.6(b) < FORMAT EXT >
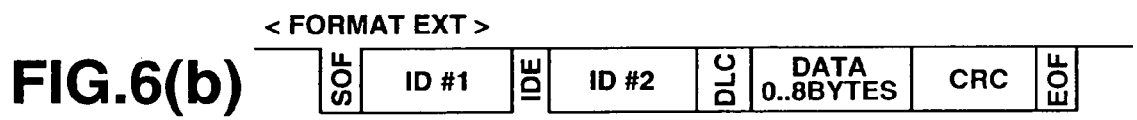
SOF : START OF FRAME
IDE : ID EXTENSION BIT
DLC : DATA LENGTH CODE
CRC : CYCLICAL REDUNDANCY CODE
EOF : END OF FRAME
IDE 「0」 : FORMAT STD, IDE 「1」 : FORMAT EXT 1) START FRAME
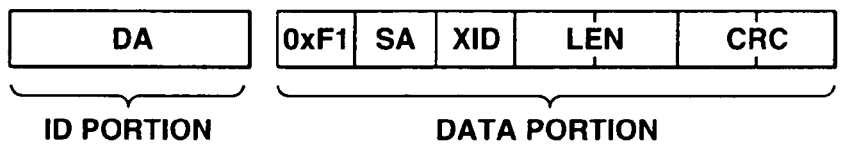
ID PORTION   DATA PORTION
2) INTERMEDIATE FRAME
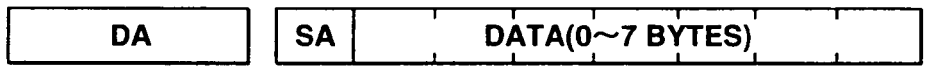
3) END FRAME
DA : DESTINATION ADDRESS
SA : SENDER ADDRESS
XID : TRANSFER ID (START AND END FRAMES HAVE THE SAME NUMBER, AND INCREMENTED EVERY TIME THE SENDER TRANSMITS)
LEN : NUMBER OF DATA BYTES
CRC : DATA CRC
FIG.7

FIG.9

CONSTRUCTION MACHINE USING THE METHOD OF CONTROLLING COMMUNICATIONS AMONG ELECTRONIC DEVICES

BACKGROUND OF THE INVENTION

1. Field of the Invention

The present invention relates to a method of controlling communications among electronic devices in a system where electronic controls with different types of communication protocols coexist, a construction machine using this control method, and an electronic circuit of such a construction machine.

2. Description of the Related Art

Recently, the number of electronic devices mounted in construction machines is increasing, and a communication procedure (protocol) used among the electronic devices has come to be used in multiple numbers.

And, a conventional construction machine is separately provided with a communication line for each of the communication procedures (hereafter, it is called, "communication protocols") to deal with the plurality of communication protocols. Such a conventional construction machine is described in, for example, Japanese Patent Publication No. 8-28911.

Thus, the number of communication lines is increased and the system structure is complex because the communication lines are provided for the multiple communication protocols respectively. And, when a new electronic device using another communication protocol is added, major modifications are required.

According to the above structure, the communication line having a different communication protocol is used to backup a communication failure of one of the communication lines. But, a processing procedure to use the line of another communication protocol is complex, it is difficult to give redundancy, and safety is low.

As described above, the conventional device had the communication lines for the respective communication protocols, increasing the number of communication lines and having a complex system structure. And, addition of a new electronic device using another communication protocol had a disadvantage that major modifications were required.

In the conventional structure where another different communication protocol is used in order to backup a communication failure of one line, the processing procedure to use the line of another communication protocol is complex. As a result, there is a problem that it is difficult to give redundancy, and safety is low.

SUMMARY OF THE INVENTION

It is an object of the present invention to provide a method of controlling communication among electronic devices, which can construct a system without increasing the number of communication lines even if a plurality of communication protocols coexist, flexibly deal with the expansion of the system, readily form a redundant structure for maintaining communications and readily realize high safety, a construction machine using the same and an electronic circuit for a construction machine.

To achieve the above object, a first embodiment of the invention is a method of controlling communications among a plurality of electronic devices which communicate by using at least one of a plurality of different types of communication protocols, comprising the steps of: connecting the electronic devices through a multiplex transmission serial communication line which supports communications by a plurality of different frame formats; and allocating one of the frame formats to one type of the communication protocols to enable coexistence of communications among the electronic devices by the plurality of different types of communication protocols on the multiplex transmission serial communication line.

Thus, the structure of the first embodiment enables decreasing the number of communication lines among the electronic devices using the plurality of different types of communication protocols and simplifying the system structure. Where a new electronic device using another communication protocol is to be added, the system can be expanded without requiring major modifications. Therefore, a very flexible system can be configured readily.

The second embodiment of invention is a construction machine having therein a plurality of communication-networked electronic devices which communicate by using at least one of a plurality of different types of communication protocols, wherein: the electronic devices are connected through a multiplex transmission serial communication line which supports communications by a plurality of different frame formats; and an electronic circuit is provided, which allocates one of the frame formats to one type of the communication protocols to enable coexistence of communications among the electronic devices by the plurality of different types of communication protocols on the multiplex transmission serial communication line.

Thus, the structure of the second embodiment enables decreasing the number of communication lines among the electronic control devices using the plurality of different types of communication protocols in the construction machine and simplifying the system structure. Where a new electronic control device using another communication protocol is to be added, the system can be expanded without requiring major modifications. Therefore, a very flexible system can be configured readily.

Particularly, the construction machine has a different type of electronic device mounted depending on a machine type, a machine grade and a destination, etc. and is required to be flexible for connection of equipment. Since the construction machine is required to offer high safety in view of the nature of the device, the aforesaid structure enables to achieve the system with high flexibility and safety.

The third embodiment of the invention is an electronic circuit in a construction machine having therein a plurality of communication-networked electronic devices which communicate by using at least one of a plurality of different types of communication protocols, wherein: the electronic devices are connected through a multiplex transmission serial communication line which supports communications by a plurality of different frame formats; and one of the frame formats is allocated to one type of the communication protocols to enable coexistence of communications among the electronic devices by the plurality of different types of communication protocols on the multiplex transmission serial communication line.

Thus, the structure of third embodiment enables enables decreasing the number of communication lines among the electronic control devices using the plurality of different types of communication protocols in the electronic circuit for the construction machine and simplifying the system structure. Where a new electronic control device using another communication protocol is to be added, the system can be expanded without requiring major modifications. Therefore, a very flexible system can be configured readily.

Particularly, the construction machine has a different type of electronic device mounted depending on a machine type, a machine grade and a destination and is required to be flexible for connection of equipment. Since the construction machine is required to offer high safety in view of the nature of the device, the adoption of this electronic circuit enables to achieve the system with high flexibility and safety.

In the second and third embodiments of the invention, the electronic device comprises data generation means which generates a transmission frame by converting into a frame format allocated in correspondence with the communication protocol when the electronic device sends data of communication protocol used by itself, data transmission means which monitors a state of sending data on the multiplex transmission serial communication line and, when data has not been sent, sends the frame data to the multiplex transmission serial communication line, and data reception means which recognizes compatibility with the communication protocol of the own device in view of a data length of a header portion of the frame data on the multiplex transmission serial communication line.

In the second and third embodiments of the invention, at least two lines of first and second lines formed of the aforesaid multiplex transmission serial communication line are disposed in a redundant form, the first line is used for normal communications among the electronic devices, and if the first line fails, the communications among the electronic devices are maintained by switching to the second line. Thus, in case of a line failure, communications among the electronic devices can be maintained by switching the communications to the line as the standby system, thereby enabling to form a redundant structure and to secure high safety.

And, in the second and third embodiments of the invention, at least two lines of first and second lines formed of the aforesaid multiplex transmission serial communication line are disposed in a redundant form, the electronic devices are given priority depending on importance of data processed by the own device, all the electronic devices are connected to the first line without depending on the priority, and the electronic device having priority higher than a predetermined level to the second line. And, the communications among the electronic devices are always performed by means of the first line and the second line, and if the second line has a failure, the communications are maintained by switching to the first line. Thus, while normally communicating with the traffic on the line lowered, if a failure occurs on the line having higher importance, communications using the line having lower importance are made possible, thereby enabling to enhance redundancy.

BRIEF DESCRIPTION OF THE DRAWINGS

FIGS. 2(a) and 2(b) are diagrams showing structures of a plurality of frame formats supported by a multiplex transmission serial communication line shown in FIG. 1;

FIG. 3 is a diagram showing the structure of an electronic control device for enabling communications by a plurality of communications protocols on a multiplex transmission serial communication line by using a plurality of frame formats;

FIGS. 6(a) and 6(b) are diagrams showing specific structures of frame formats supported on the multiplex transmission serial communication line shown in FIG. 1 and FIG. 4;

FIG. 7 is a diagram showing one example of a format structure when a frame of protocol A is transmitted by using format STD shown in FIG. 6;

FIG. 9 is a diagram showing one example of a format structure when a frame of protocol B is transmitted by using format EXT shown in FIG. 6.

DESCRIPTION OF THE PREFERRED EMBODIMENT

New, one embodiment according to the present invention will be described in detail with reference to the attached drawings.

Figure 1:
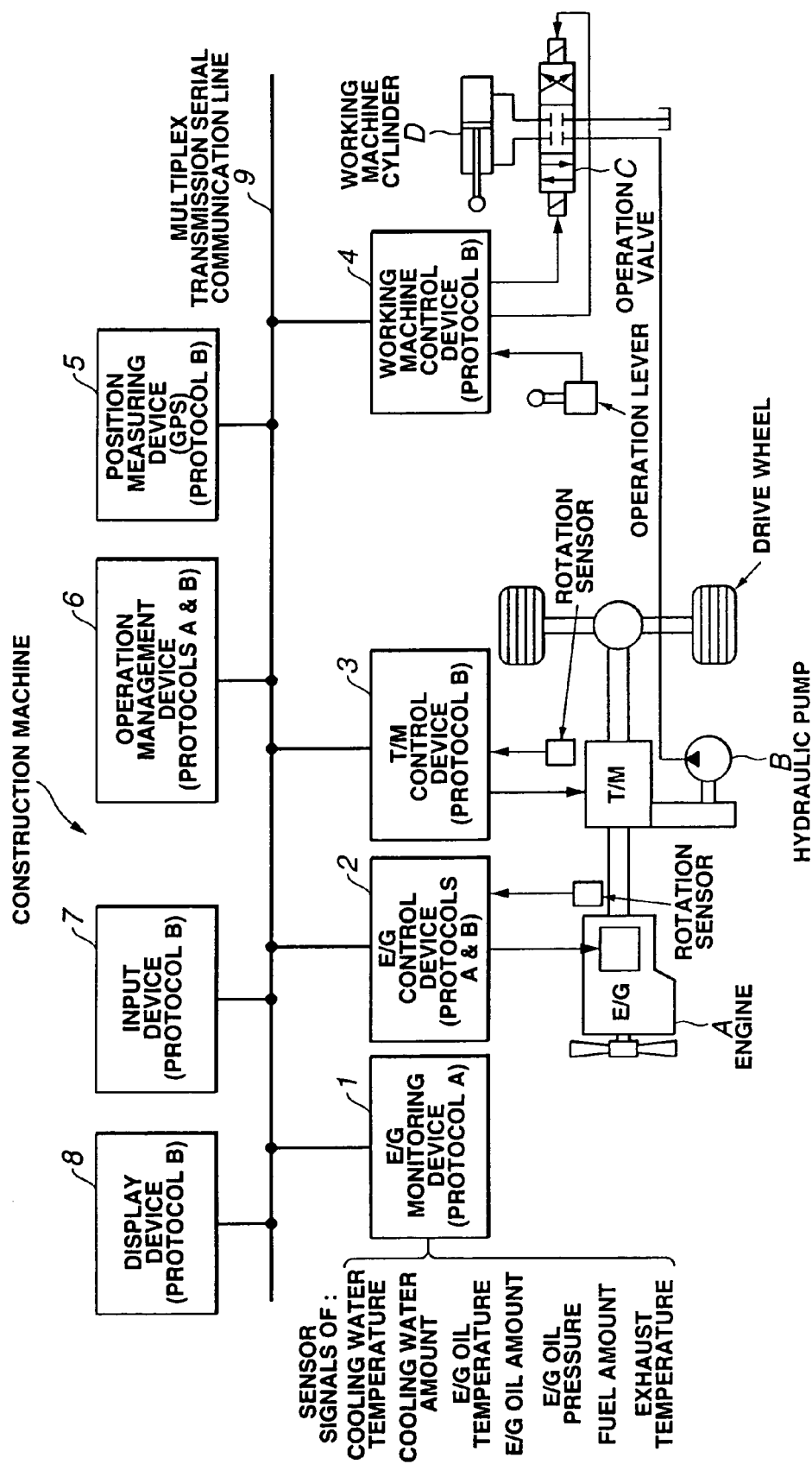
FIG. 1 is a diagram showing the general structure of an electronic control circuit of a construction machine according to one embodiment of the invention.

FIG. 1 is a diagram showing a general structure of an electronic control circuit for the construction machine according to one embodiment of the present invention. The construction machine shown here has a structure in that a plurality of electronic control devices for communications by using at least one of a plurality of different types of communication protocols are networked for communications. In this embodiment, the structure shown is of a hydraulic construction machine.

As shown in FIG. 1, this hydraulic construction machine has engine A as a drive source, hydraulic pump B driven by the engine, operation valve C and working machine cylinder D.

This hydraulic construction machine has therein a plurality of communication-networked electronic control devices for communicating by using at least one of a plurality of different types of communication protocols (A, B).

In this embodiment, the above electronic control devices include E/G (engine) monitoring device 1, E/G (engine) control device 2, T/M (transmission) control device 3, working machine control device 4, position measuring device 5, operation management device 6, input device 7, display device 8 and multiplex transmission serial communication line 9.

Here, the E/G (engine) monitoring device 1 is a device for monitoring and storing an operation condition of the engine according to sensor signals of a cooling water temperature, a cooling water amount, an oil temperature, an oil amount, a fuel amount, an exhaust temperature and the like of the engine, failure information of an engine control device and others. In this case, communication protocol A is used to communicate.

The E/G (engine) control device 2 is a device for controlling to a predetermined engine speed by changing a fuel injection amount of the engine according to a level of depressing an unshown accelerator pedal. In this case, communication protocols A and B are used to communicate.

The T/M (transmission) control device 3 is a device for controlling gears of a transmission according to a signal from an unshown shift lever. In this case, communication protocol B is used to communicate.

The working machine control device 4 is a device for controlling a working machine cylinder by varying an opening of the operation valve according to an operation signal from an operation lever. In this case, communication protocol B is used to communicate.

The position measuring device 5 is a device for measuring the present position of the vehicle according to GPS (Global Positioning System). In this case, communication protocol B is used to communicate.

The operation management device 6 is a device for monitoring and recording the operating conditions of the vehicle body and respective control devices obtained through the sensor signals and communication lines. For example, they are record of failure occurrence history, record of sensor signals at failures, record of maintenance history and others. In this case, communication protocols A and B are used to communicate.

The input device 7 is a device for entering control modes to the respective control devices. In this case, communication protocol B is used to communicate.

The display device 8 is a device for displaying control modes, sensor signals and failure information of the respective control devices. In this case, communication protocol B is used to communicate.

The multiplex transmission serial communication line 9 is connected with the aforesaid electronic control devices (the E/G (engine) monitoring device 1, the E/G (engine) control device 2, the T/M (transmission) control device 3, the working machine control device 4, the position measuring device 5, the operation management device 6, the input device 7 and the display device 8) and serves as a transmission path for transmitting and receiving data such as a request for processing performed among these electronic control devices, control modes shared among the networked electronic control devices, sensor signals, failure information and the like. And, this multiplex transmission serial communication line 9 is a protocol line for supporting communications by a plurality of different frame formats.

The present invention configures a network capable of two-way communications in one to n (n is 2 or more) among the electronic control devices on the multiplex transmission serial communication line 9 according to a plurality of different types of communication protocols by allocating any one of the above plurality of different frame formats to one type of the communication protocol (A or B in this case) used by the respective electronic control devices.

Here, as a specific frame structure of the protocols (A, B) which can coexist on the multiplex transmission serial communication line 9, for example, the frame of protocol A comprises frame source address [Source Add.], frame destination address [Destination Add.], number by which processing desired to be executed by a processing requested side is shown [Procedure No.], [Sequence No.] which is managed by the processing requester, incremented whenever transmission is made and used to specify whether a response is to the frame of the pertinent Procedure No. in a series of transmitting and receiving procedures and an argument [Argument] (0–255 bytes) to the processing designated in Procedure No.

The frame of the protocol B comprises number [Parameter No.] indicating a type of parameter, source address [Source Add.], and data [Parameters (0–8 bytes)] specified by the above number. And, the control device having data with contents specified by the above Parameter No. transmits data in a broadcast without designating a destination at a given time interval.

In this embodiment, network control such as collision control and busy control of transmission data on the multiplex transmission serial communication line 9 is performed as described below. First, bus access, collision detection and mediation will be described. Each of the electronic control devices starts to transmit upon detecting that the line is available. The electronic control device monitors the signal level of the communication line while transmitting. L level takes precedence over H level, and when there are two control devices outputting L level and H level respectively, the line has L level. When the line is L while the electronic control device outputs H, it loses its priority and stops transmitting. When the line is H while the electronic control device outputs L, it judges as a bit error and stops transmitting.

Now, busy control will be described. In this embodiment, when protocol is A, No. indicating BUSY is allocated to Procedure No., and if a processing node having received a processing request cannot process, BUSY is returned instead of Acknowledge. Protocol B is not provided with busy control.

FIG. 2 is a diagram showing structures of a plurality of frame formats supported by the multiplex transmission serial communication line 9 shown in FIG. 1. This embodiment shows one example of structures of two frame formats. And, for example, the communication protocol A is allocated the frame format shown in FIG. 2(*a*) while the communication protocol B is allocated the frame format shown in FIG. 2(*b*), so that communications can be made by a plurality of communication protocols on the multiplex transmission serial communication line 9 shown in FIG. 1.

In this case, headers have a different bit length falling in a relation of N<M, indicating that the format B has a longer header length. And, the present invention distinguishes the protocol types according to a difference in header length as will be described afterward. Data portions (DATA and EOF) other than the header section have a length (bit length) common (L bit) among the respective formats.

In this embodiment, only two are shown as the frame format supported on the multiplex transmission serial communication line 9 but it is not limitative, and another frame format may be used according to a type of communication protocol.

FIG. 3 is a diagram showing a structure of the electronic control devices (1–8) for enabling communications by a plurality of communication protocols on the multiplex transmission serial communication line 9 by using the above plurality of frame formats.

As shown in FIG. 3, each of the electronic control devices (1–8) has control section 100 for controlling the entire device, data conversion section 101 which produces a transmission frame by converting frame data according to the communication protocol (A or B) used by the own device into a frame format allocated to the communication protocol, data sending section 102 which monitors a state of sending data on the multiplex transmission serial communication line 9 and sends the converted frame data to the multiplex transmission serial communication line when the data has not been transmitted, and data reception section 103 which recognizes adaptability with the communication protocol of the own device according to a data length of the header section of the frame data on the multiplex transmission serial communication line 9 and receives the frame data when it is judged adaptable.

In this structure, data of the communication protocol (A or B) used by the own device is transmitted by the data conversion section 101, and data converted into the frame format supported on the multiplex transmission serial communication line 9 is restored so to be processed by the control section 100 by using the data reception section 103.

According to the above structure, any one of a plurality of different frame formats supported on the multiplex transmission serial communication line is allocated to one type of the communication protocols used by the respective electronic control devices, and the type of the communication protocol is judged according to a data length (header section length) of the frame format. Accordingly, communications between the electronic control devices by a plurality of different types of communication protocols on a single multiplex transmission serial communication line can be made to coexist. And, the number of communication lines among the electronic control devices using a plurality of different types of communication protocols can be decreased to simplify the system structure. And, the system can be expanded without making major modifications to add a new electronic control device using another communication protocol. Therefore, a system with a high flexibility can be easily constructed.

Now, a backup function used in case of a failure of the multiplex transmission serial communication line 9 will be described.

Figure 4:
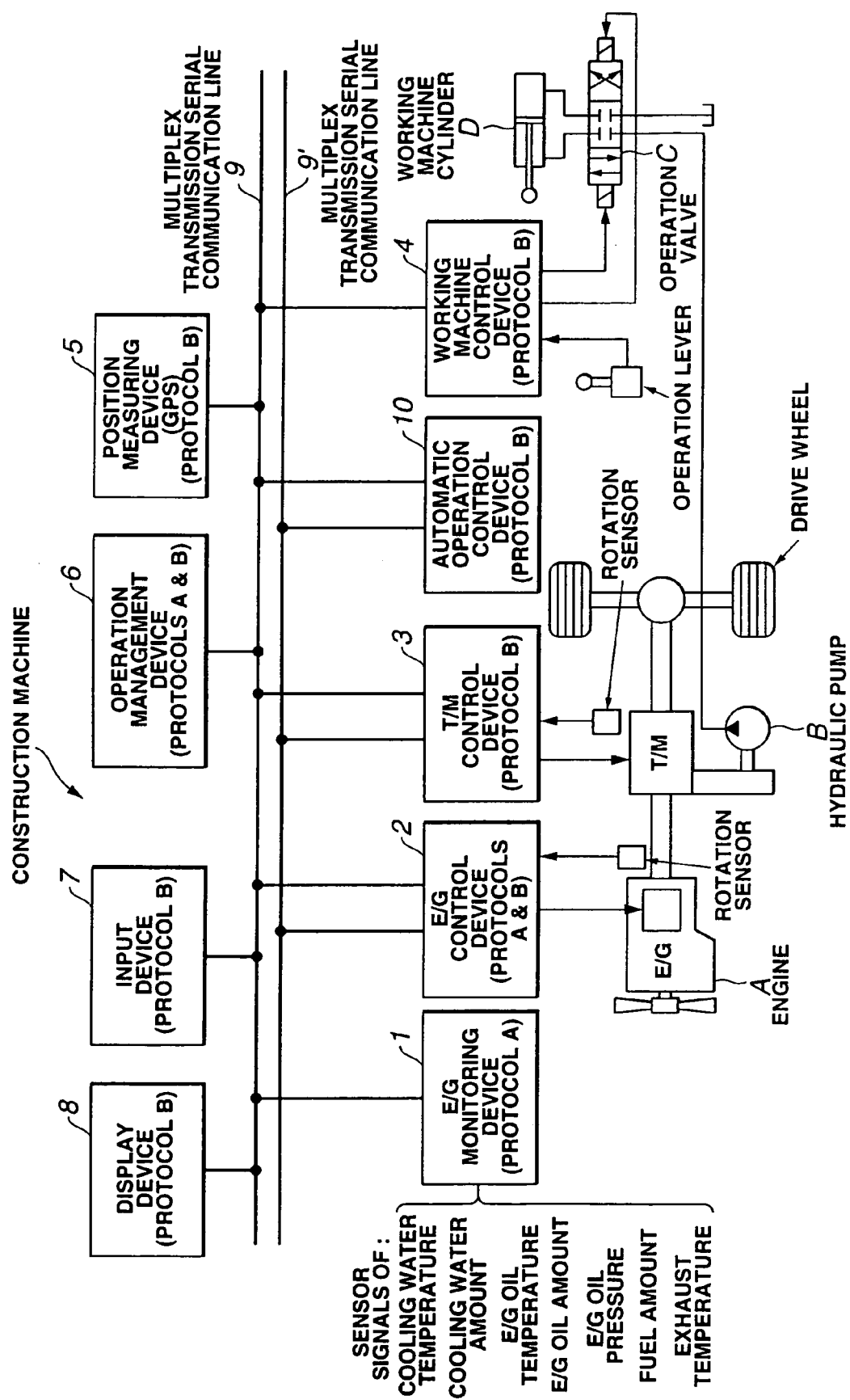
FIG. 4 is a diagram showing a structure having a multiplex transmission serial communication line different from the above communication line so to have a backup function in case of a failure of the multiplex transmission serial communication line shown in FIG. 1.

FIG. 4 is a diagram showing a general structure of an electronic control circuit for the construction machine according to another embodiment, wherein multiplex transmission serial communication line 9' is disposed independent of the aforesaid communication line 9 as a backup mechanism in case of a failure of the multiplex transmission serial communication line 9 shown in FIG. 1. This case also has a structure with automatic operation control device 10 newly disposed. Here, the automatic operation control device 10 is a device for automatic operation of the vehicle by sending the control signal to the respective control devices of the engine, the transmission and the working machine based on the signal of the position measuring device according to a predetermined course.

And, the multiplex transmission serial communication line 9 and the serial communication line 9' of this embodiment are selectively used according to the priority of contents of data to be transmitted. Specifically, the multiplex transmission serial communication line 9' (line with high importance) is used to transmit control information required for automatic operation with the automatic operation determined to be of high importance, and the multiplex transmission serial communication line 9 (line with low importance) is used with other data determined to be of low importance.

In order to maintain communications of the control information required for the automatic operation, the electronic control devices (E/G control device 2, T/M control device 3, automatic operation control device 10) which transmit and receive control information required for the automatic operation are also connected to the multiplex transmission serial communication line 9 (line with low importance).

Where a failure occurs on the multiplex transmission serial communication line 9' to be the line with high importance, the E/G control device 2, the T/M control device 3 and the automatic operation control device 10 maintain communications by switching the line used for communications to the multiplex transmission serial communication line 9 (line with low importance).

Thus, two lines are provided according to the importance of the contents of transmission data to maintain communications with a communication traffic lowered, and if a trouble occurs in the line with high importance, communications using the line with low importance can be made. Therefore, communications of data with high importance can be secured, and redundancy is improved. It can also be used as a backup for another communication line by configuring as described above.

It is also possible to use the line with high importance as a backup for the line with low importance.

Figure 5:
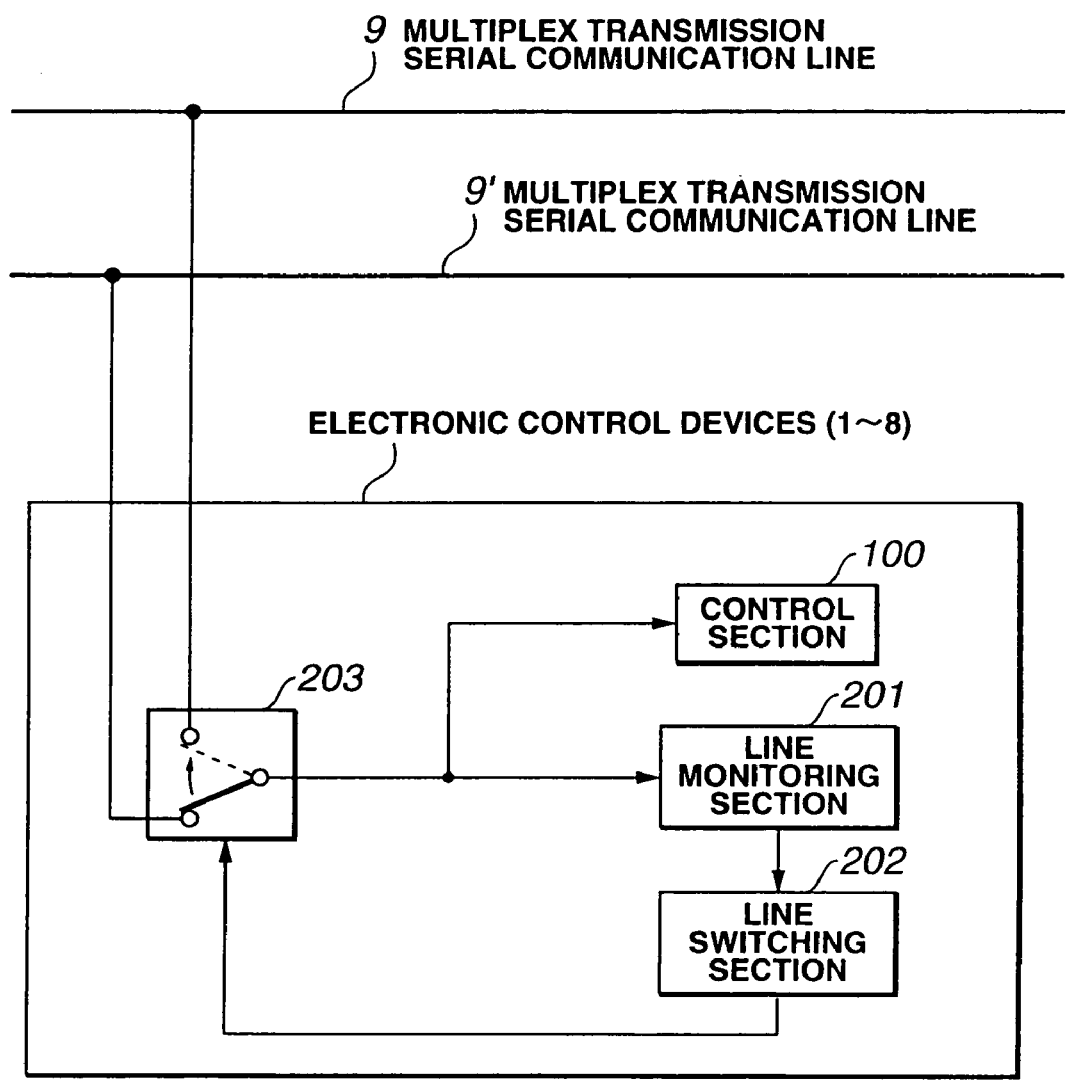
FIG. 5 is a diagram showing a structure of an electronic control device by which a line switching operation is enabled.
Figure 8A:
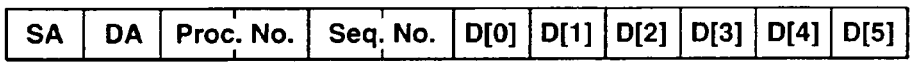
FIGS. 8(a) to 8(e) are diagrams showing one example of a format structure when a frame of protocol A is transmitted by using format STD shown in FIG. 6.
Figure 8B:
Figure 8C:
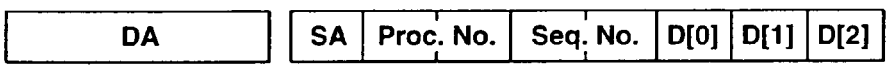
Figure 8D:
Figure 8E:

FIG. 5, is a diagram showing a structure of the electronic control device for enabling the aforesaid line switching operation.

As shown in FIG. 5, the electronic control device comprises control section 100 for controlling the whole device, line failure monitoring section 201 for monitoring a state of failure of the line being used, and line switching section 202 for switching communications to another normal line by means of line switching switch 203 when a failure is detected.

Here, one embodiment of a switching operation by using another line as backup will be described.

For example, when the aforesaid communication protocol A is used, the electronic control device monitors whether a positive response (Acknowledge frame) is received or not after the line monitoring section 201 sends a processing request, and judges that the processing request has failed if no positive response (Acknowledge frame) is received from a destination within a predetermined period. And, if the failure occurs a predetermined number of times continuously to a plurality of destinations, a line change instruction is sent to the line switching section 202, which then switches the line by means of the line switching switch 203.

When the positive response is received, predetermined protocol data is formed by the data reception section shown in FIG. 3, and predetermined processing is conducted by the control section 100.

For example, when the communication protocol B is used, analysis is made by the data reception section 103 shown in FIG. 3 to store data. Therefore, when all data to be updated in a predetermined period is not updated, a line switching request is sent to the sender by some method (e.g., using the protocol A).

In the above embodiment, both the communication lines are used at the same time, and when one of the communication lines has a failure, the other communication line is used to continue communications to keep redundancy. But, the invention is not limited to it but may be configured as shown in FIG. 5 so that the respective electronic control device (1 to 10) are connected to both the multiplex transmission serial communication line 9 and the multiplex transmission serial communication line 9', the multiplex transmission serial communication line 9 is generally used, and when a failure occurs on the communication line 9, switching to the multiplex transmission serial communication line 9' is performed to keep communications among the respective electronic control devices (1 to 10).

Lastly, a specific example of the frame format shown in FIG. 2 will be described.

FIG. 6 is a diagram showing a specific structure of a frame format supported on the multiplex transmission serial communication lines 9 and 9' shown in FIG. 1 and FIG. 4, FIG. 6(a) showing a structure of format STD and FIG. 6(b) showing a structure of format EXT. It is seen from FIG. 6 that ID portions have a different length depending on types of formats.

And, FIG. 7 and FIG. 8 show an example of the structure of a format to transmit the frame of protocol A by using the format STD shown in FIG. 6. As shown in FIG. 7, a plurality of frames, namely (1) start frame, (2) intermediate frame and (3) end frame, are prepared to transmit by using the above format STD. And, for example, to send the frame of protocol A shown in FIG. 8(*a*) in the format STD, it is divided into the start frame shown in FIG. 8(*b*), the intermediate frames shown in FIGS. 8(*c*) and (*d*) and the end frame shown in FIG. 8(*e*) and transmitted sequentially from the top one.

FIG. 9 is a diagram showing one example of the structure of a format when the frame of protocol B is transmitted by using the format EXT shown in FIG. 6.

And, when the individual electronic control devices using the formats A, B configured as described above use the protocol A, the data conversion section 101 shown in FIG. 3 divides the frame of protocol A into a plurality of frames (start frame, intermediate frame and end frame) using the format STD to produce the transmission frame to transmit the protocol A. Then, the data transmission section 102 transmits the divided plurality of frames in order of the start frame, the intermediate frame, and the end frame. And, to receive the protocol A, the data reception section 103 shown in FIG. 3 reconfigures the frame of protocol A from the format STD frame divided into the plurality of frames by the electronic control device of the destination as described above, analyzes upon completion of the frame and makes predetermined processing.

On the other hand, when the protocol B is used, the data conversion section 101 shown in FIG. 3 reconfigures the frame of protocol B into format EXT to transmit in order to transmit the protocol B. To receive the protocol B, the data reception section 103 shown in FIG. 3 analyzes the contents of the frame of format EXT reconfigured by the electronic control device of the destination as the frame of protocol B as described above and makes storing processing of data.

To coexist different protocols on the aforesaid multiplex transmission serial communication line, it is desirable to use a communication method by which the transmission interval of one of protocols is sufficiently long and a large influence is not applied to the transmission interval of the other protocol.

In this embodiment, the multiplex transmission serial communication line is achieved by wiring but may be achieved by wireless by means of radio waves, infrared rays or the like. In the aforesaid embodiment, the portion indicating a difference of format is positioned as the header at the top of the frames so that a difference in frame format can be recognized without receiving the whole frames by the receiver. But, the portion indicating the difference of frame format may be positioned at any portion of the frame. For example, it may be placed at the rear end of the frame as a footer. And, after receiving the whole frames, the frame format may be analyzed and judged.

What is claimed is:

1. A method of controlling communications among a plurality of electronic devices in a construction machine, which comprises steps of:
   connecting first and second electronic devices of the plurality of electronic devices through a multiplex transmission serial communication line, the multiplex transmission serial communication line supporting communications by a plurality of different communication protocols, the first and second electronic devices respectively using at least one of different first and second communication protocols, and the first and second electronic devices being arranged within a construction machine;
   allocating a first frame format to the first communication protocol of the first electronic device and a second frame format to the second communication protocol of the second electronic device, the first and second frame formats having a different header length;
   transmitting information from the first and second electronic devices along the multiplex transmission serial communication line using the first and second communication protocols of the first and second electronic devices with the allocated first and second frame formats; and
   identifying the first and second communication protocols in communications on the multiplex transmission serial communication line by the different header length of the first and second frame formats, thereby enabling coexistence of the communications by the plurality of different communication protocols on the multiplex transmission serial communication line.

2. A construction machine, which comprises:
   first and second electronic devices being arranged within the construction machine and including devices for monitoring the construction machine, controlling the construction machine, or displaying information about the construction machine; the first and second electronic devices respectively using at least one of different first and second communication protocols;
   a multiplex transmission serial communication line connecting the first and second electronic devices, the serial communication line supporting the at least one of different first and second communication protocols; and
   an electronic circuit, which allocates a first frame format to the first communication protocol of the first electronic device and a second frame format to the second communication protocol of the second electronic device, the first and second frame formats having a different header length, and which identifies the first and second communication protocols communicating on the multiplex transmission serial communication line by the different header lengths of the first and second frame formats, thereby enabling coexistence of communications among the electronic devices by a plurality of different communication protocols on the multiplex transmission serial communication line including the at least one of different first and second communication protocols.

3. An electronic circuit in a construction machine, which comprises:
   first and second electronic devices being arranged within the construction machine and including devices for monitoring the construction machine, controlling the construction machine, or displaying information about the construction machine; the first and second electronic devices respectively using at least one of different first and second communication protocols;
   the electronic devices being connected through a multiplex transmission serial communication line which supports communications by a plurality of different communication protocols including the at least one of different first and second communication protocols; and
   means for allocating a first frame format to the first communication protocol of the first electronic device and a second frame format to the second communication protocol of the second electronic device, the first and second frame formats having a different header length, and for identifying the first and second communication protocols communicating on the multiplex transmission serial communication line by the different header lengths of the first and second frame formats, thereby enabling coexistence of communications among the electronic devices by the plurality of different communication protocols on the multiplex transmission serial communication line including the at least one of different first and second communication protocols.

* * * * *